Feb. 20, 1951

G. M. GIANNINI

SIGNAL OPERATED CONTROL FOR TWO-CHANNEL TRANSMISSION SYSTEMS 2,542,921

Filed July 2, 1945

4 Sheets-Sheet 1

INVENTOR.
GABRIEL M. GIANNINI

BY Davis, Lindsey, Smith & Shonts,

ATTORNEYS

300

INVENTOR.
GABRIEL M. GIANNINI
BY Davis, Lindsey, Smith & Shonts,
ATTORNEYS

INVENTOR.
GABRIEL M. GIANNINI
BY
Davis, Lindsey, Smith & Shonts,
ATTORNEYS

INVENTOR.
GABRIEL M. GIANNINI
BY
Davis, Lindsey, Smith & Shonts,
ATTORNEYS

Patented Feb. 20, 1951 2,542,921

UNITED STATES PATENT OFFICE 2,542,921

SIGNAL OPERATED CONTROL FOR TWO-CHANNEL TRANSMISSION SYSTEMS

Gabriel M. Giannini, West Los Angeles, Calif., assignor, by mesne assignments, to Automatic Electric Laboratories, Inc., Chicago, Ill., a corporation of Delaware Application July 2, 1945, Serial No. 602,710

3 Claims. (Cl. 178—44)

Figure 1:
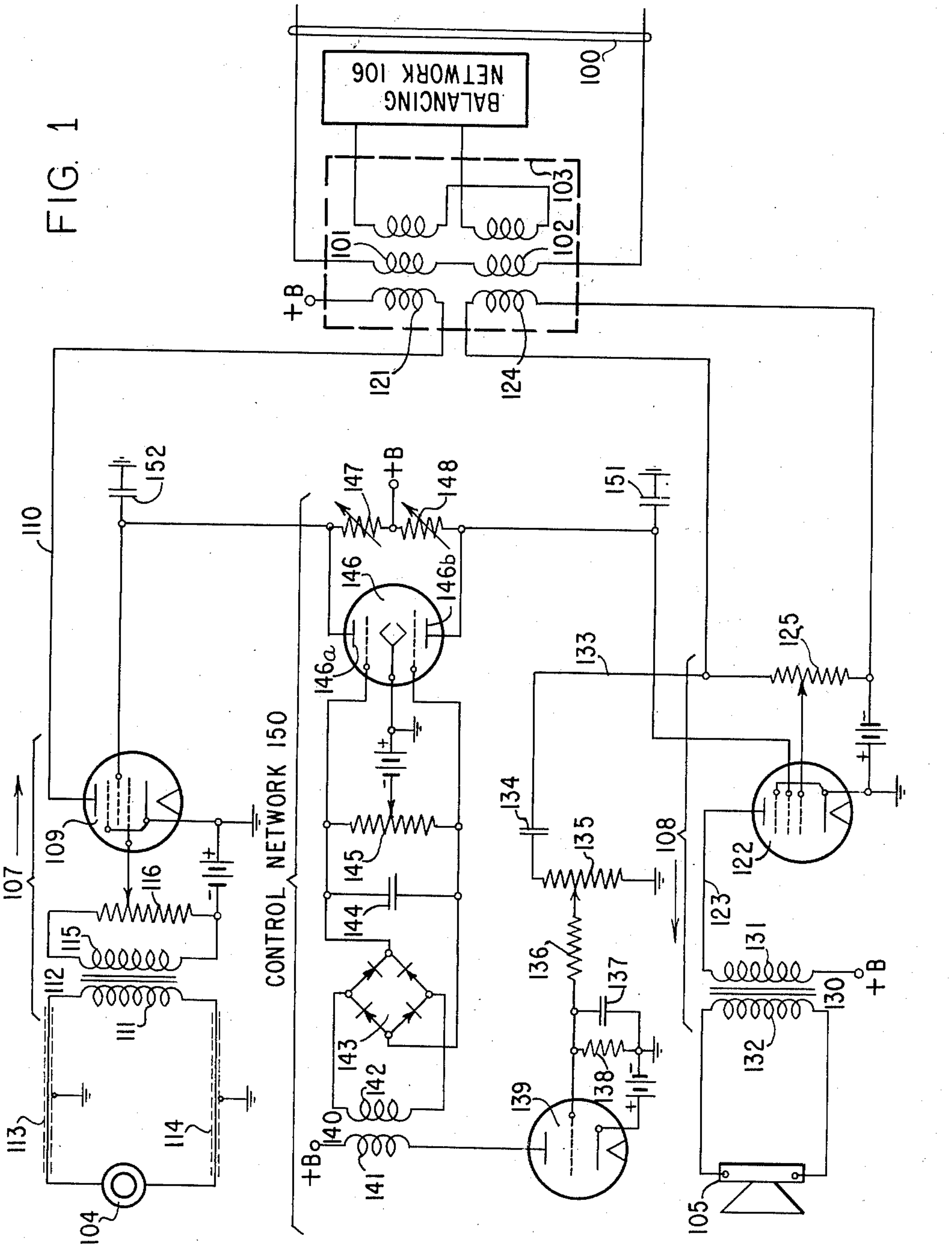

The present invention relates generally to improvements in signal current transmission systems of the type in which voice operated control circuits are provided in conjunction with two channel transmission systems to control the signal current gains of the two channels, and, more particularly, to improvements in telephone substation circuits having incorporated therein signal current channels for the transmission of incoming and outgoing signal currents.

In the usual telephone substation circuit a hybrid system or anti-side-tone impedance network is provided for preventing signal currents developed by operation of the transmitter or microphone from being transmitted to the receiver or loudspeaker. In this type of arrangement one of the factors which determines the efficiency of the side-tone suppression is the impedance of the talking circuit established by way of two connected subscriber lines. This impedance is not the same for any two different established connections, and, accordingly, the hybrid system of each substation is usually balanced to provide maximum side-tone suppression efficiency for average line conditions. In installations wherein amplification of incoming and outgoing signal currents is required, as, for example, in executive loudspeaking sets, the conditions of unbalance introduced in the substation circuit by the impedances of the lines over which an established connection extends may become intolerable. This is particularly true in substation installations provided in an exchange area where the subscriber lines are of widely different lengths. In order completely to obviate or to minimize the singing which may result due to unbalance of the substation circuit occasioned by unfavorable line conditions, signal controlled switching means may be provided in the substation circuit for selectively blocking the channels when not in use. In one arrangement of this character the signal channels are completely blocked when not in use. More particularly, during intervals when the transmitting means of the substation is being used to transmit outgoing signal currents, the incoming signal current channel is maintained completely inactive. Conversely, during those periods when signal currents are incoming to the substation, the transmitting or outgoing signal current channel is maintained completely inactive. An arrangement of this character, while satisfactory in operation, prevents any interruption of a speech train being transmitted in one direction in response to signal currents transmitted in the opposite direction. In other words, conversation break-ins are positively prevented.

It is an object of the present invention to provide improved telephone substation apparatus of the character described wherein one of the transmission channels is preferably maintained at a normal gain and the opposite channel is preferably partially blocked but sufficiently active to be automatically responsive to pass a nominal amount of sound induced currents, and wherein a control circuit is arranged to increase the gain of the partially blocked transmission channel to unblock the same and to decrease the normal gain of the opposite channel to block the same in a simple and reliable manner.

It is another object of the invention to provide an improved transmission system particularly suited for use in telephone substation circuits of the character described, wherein the control circuit is arranged in an improved manner to utilize electronic devices in order to render the control circuit exceedingly fast in operation to effect channel blocking and unblocking operations without any substantial speech clipping.

It is a further object of the invention to provide an improved transmission system of the character described, wherein the screen electrode of one of the amplifier tubes in each transmission channel is utilized as the control element for blocking and unblocking the associated channel under the influence of a control circuit.

Figure 2:
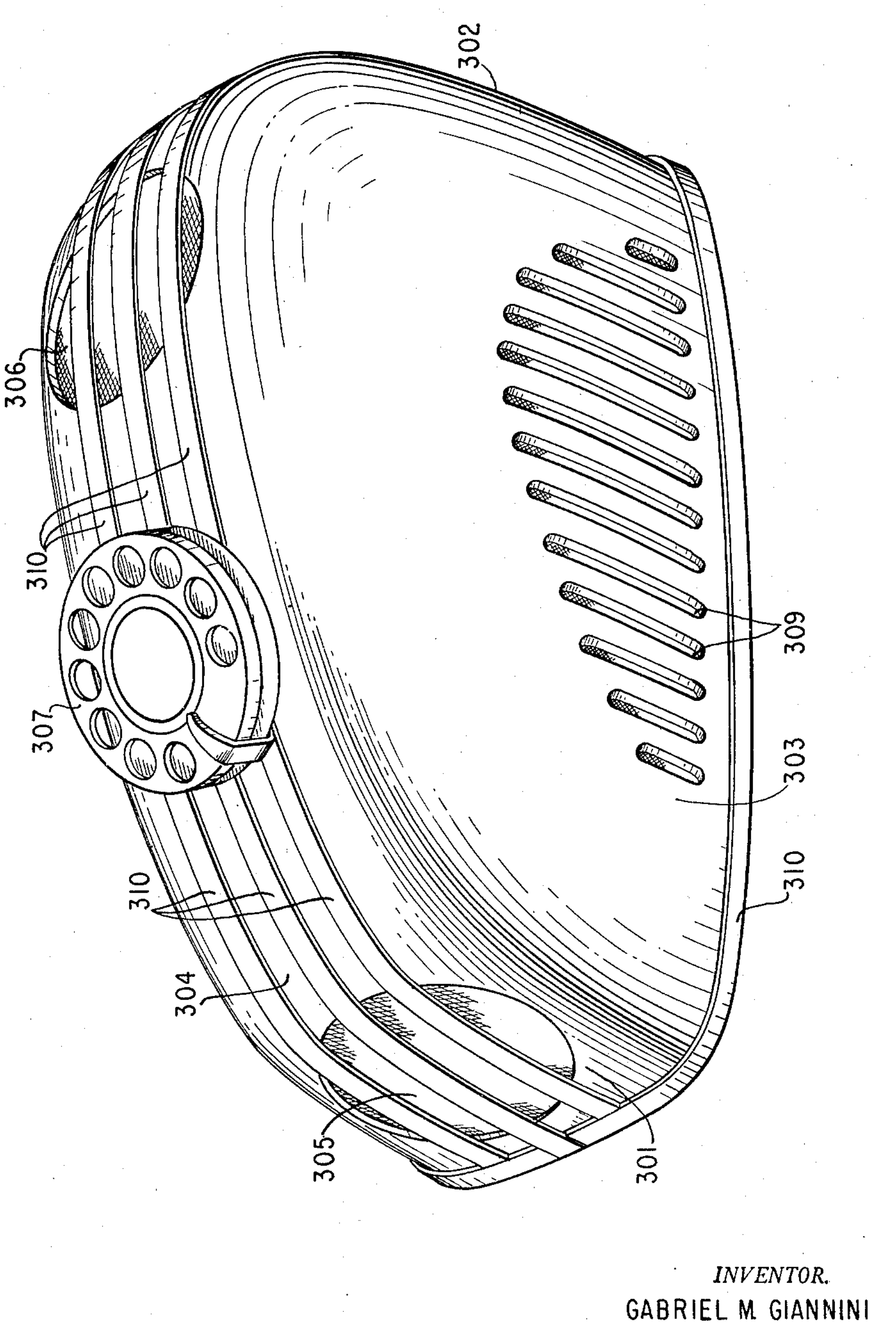
Figure 3:
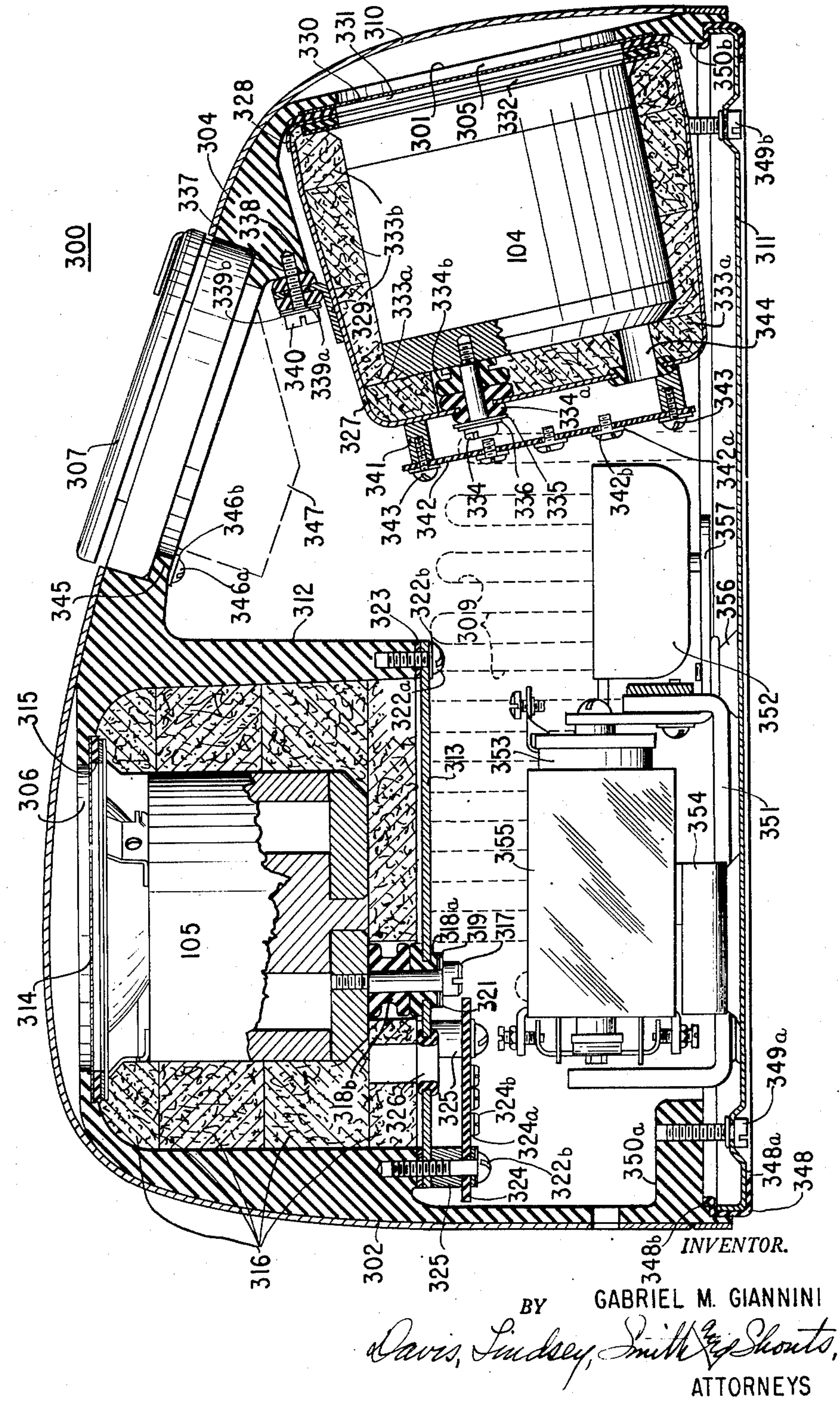

The invention, both as to its organization and method of operation, together with further objects and advantages thereof, will best be understood by reference to the specification taken in connection with the accompanying drawings in which Figure 1 illustrates the substation circuit arrangement of an improved system having incorporated therein certain of the features of the invention as briefly outlined above; Fig. 2 is a perspective view of one form of a loudspeaker-microphone substation instrument which may be used at each of the stations of the system; Fig. 3 is a sectional view of the substation instrument of Fig. 2 showing the usual instrumentalities including the loudspeaker, the microphone, the ringer and the dial; and Figs. 4 to 8, inclusive, illustrate the details of the microphone and loud speaker assemblies provided at each of the substations of the system.

Referring now more particularly to Fig. 1 of the drawings, the improved control circuit is illustrated as being incorporated in a loudspeaking substation circuit adapted to be connected to a telephone line 100 terminating at the windings 101 and 102 of the hybrid system 103. The telephone line 100 may, for example, form a part of a conventional automatic or manual telephone system, in which case the distant end thereof will terminate in a line circuit located at the central exchange. Briefly described, the substation circuit comprises a transmitter or microphone 104 and a receiver or loudspeaker 105 which are adapted respectively to be coupled to an anti-side-tone impedance network including the hybrid system 103 and a balancing network 106 by means of the signal transmission channels 107 and 108.

The outgoing signal current channel 107 comprises a vacuum tube amplifier including the single amplifier tube 109 which is adapted to receive signal currents from the microphone 104 and to deliver its output to the hybrid system 103. More particularly, the microphone 104 is coupled to the input electrodes of the amplifier tube 109 through the coupling transformer 112 which includes the input or primary winding 111 and the output or secondary winding 115. The primary winding 111 is connected in series with the microphone 104 by way of the shielded conductors 113 and 114, and the secondary winding 115 is shunted by the adjustable voltage dividing resistor 116 which is connected to the input electrodes of the amplifier tube 109. The output electrodes of the tube 109 are coupled to the winding 121 of the hybrid system 103 by way of the conductor 110 and the +B terminal of a source of anode current, not shown. Although the outgoing channel 107 has been illustrated as having a single stage of amplification, it should be understood that additional stages of amplification of any suitable type, such as resistive, capacitive or inductive coupled, may also be provided.

The incoming signal current transmission channel 108 comprises a vacuum tube amplifier including the single amplifier tube 122. More specifically, the incoming signal current terminals of the hybrid system 103 are coupled to the input electrodes of the amplifier tube 122 through a coupling network which includes the winding 124 of the hybrid system 103 and an adjustable voltage dividing resistor 125. The output electrodes of the tube 122 are coupled to the primary winding 131 of the transformer 130 by way of the conductor 123 and the +B terminal of the source of anode current, not shown. The secondary winding 132 of the transformer 130 is, in turn, connected to the voice coil of the loudspeaker 105.

The control network 150, as indicated above, is provided for the purpose of increasing the gain of the signal current channel 108 and decreasing the gain of the signal current channel 107 when signal current transmission is received over the telephone line 100. Briefly considered, the control network 150 comprises an amplifier triode 139, a full-wave rectifier network 143 of the dry disc type, a twin triode amplifier tube 146, and a pair of variable resistors 147 and 148. More specifically, the input conductor 133 of the control network 150 is connected to one terminal of the adjustable resistor 125 included in the incoming channel 108 and to the input electrodes of the amplifier tube 139 by way of the high pass filter comprising the condenser 134 and the variable resistance 135, and the low pass filter comprising the resistance 136 and the condenser 137. The values of the resistances and the condensers forming the high and low pass filters are preferably such that frequencies between 700 and 1000 cycles are permitted to pass and control the input electrodes of the tube 139. The resistance 138 shunting the condenser 137 provides the necessary biasing potential for the input electrode of the tube 139. The output electrode of the tube 139 is connected to one terminal of the primary winding 141 of the transformer 140 and the other terminal thereof is connected to the +B terminal of the source of anode potential, not shown. The secondary winding 142 of the transformer 140 is connected to the input electrodes of the twin triode amplifier tube 146 by way of the rectifier network 143 of the dry disc type and a time constant network, including the condenser 144 and the resistance 145 having its central tap connected to a biasing battery included in the input circuits of the tube 146. The rectifiers comprising the network 143 may be of the copper oxide or the selenium dry disc type. The output electrode 146*a* of the tube 146 is connected to the screen grid electrode of the tube 109 and to the grounded condenser 152, the latter condenser providing filtering to prevent the impression of audio signals thereon from the control network. The output electrode 146*b* of the tube 146 is connected to the screen grid electrode of the tube 122 and to the grounded condenser 151, the condenser 151 providing filtering to prevent the impression of audio signals thereon from the control network. The output electrodes 146*a* and 146*b* of the tube 146 are shunted by the series-connected variable resistors 147 and 148, the junction between these resistors being connected to the +B terminal of the source of anode potential, not shown.

With no signal transmission over the line 100, the values of the resistors 147 and 148 are chosen so that the voltage drop through them, due to the anode currents of the tube 146 and the screen grid currents of the tubes 109 and 122, is sufficient to bring the operating screen voltages of the tubes 109 and 122 to such a value that gains around the loop including the outgoing channel 107 and the incoming channel 108 are of such a value as to substantially eliminate the possibility of singing. However, the values of the resistors 147 and 148 should also be chosen so that the outgoing channel 107 will normally have a maximum gain, consistant with stability of the circuit, to allow a normal amount of signal current transmission to pass therethrough, and so that the incoming channel 108 will normally operate at a gain level that is well below the maximum gain.

With the system conditioned for operation, but inactive, no signal currents are transmitted through either of the two amplifier tubes 109 and 122. Therefore, no signal currents are transmitter through the band pass filter network, the amplifier tube 139 and the rectifier network 143 to control the operation of the twin triode amplifier tube 146. Consequently, no bias voltage is developed across the resistor 145. Accordingly, the space current flow through the two output electrodes 146*a* and 146*b* of the tube 146 and their respective associated resistors 147 and 148 is determined principally by the voltage of the biasing battery connected to the input electrodes of the tube 146.

With the circuit arranged in the above described manner, voice signals received from the microphone 104 are amplified by the tube 109 and transmitted over the telephone line 100 through the hybrid system 103. Such signals, however, are not reproduced in the incoming channel 108. However, when a signal is received over the line 100 and the hybrid system 103, the amplifier tube 122 in the incoming channel 108 responds in the usual manner to control the loudspeaker 105. However, signals reproduced by the loudspeaker 105 are not of sufficient strength to provide satisfactory volume. A portion of the signal voltage, however, is picked up through the frequency discriminating network, including the condensers 134 and 137 and the resistances 135 and 136, and amplified by the amplifier tube 139. This amplified signal is rectified by the rectifier network 143 and applied as a direct current voltage across the grids of the control tube 146. The grid electrode associated with the output electrode 146b is made more negative and the grid electrode associated with the output electrode 146a is made more positive. Consequently the anode current of the output electrode 146a is increased, thereby increasing the voltage drop across the resistor 147 and thus lowering the screen bias on the screen grid of the tube 109. As the screen potential of the screen grid of the tube 109 is lowered the amplification factor thereof is decreased, thus blocking the outgoing channel. Simultaneously with the above described control over the screen electrode of the tube 109, the screen electrode of the tube 122 in the incoming channel 108 is also controlled. The latter control is obtained as a result of the grid electrode associated with the output electrode 146b becoming more negative. This causes the anode current of the output electrode 146b to be decreased, thereby lowering the voltage drop across the resistor 148 and thus increasing the screen voltage applied to the screen grid of the tube 122. As the potential of the screen grid of the tube 122 increases, the amplification factor of this tube is increased and thus causes unblocking of the incoming channel 108. Accordingly, the outgoing channel 107 is effectively blocked to prevent the microphone 104 from responding to signals reproduced by the loudspeaker 105 and the incoming channel 108 is effectively unblocked to permit satisfactory amplification and reproduction by the loudspeaker 105 of signals received over the telephone line 100.

From the above explanation it will be understood that the increase in signal current gain through the incoming channel 108 is accompanied by a corresponding decrease in gain through the outgoing channel 107. The extent to which the gains are changed is dependent upon the setting of the adjustable tap on resistor 145. This tap is preferably adjusted so that the increase in gain in channel 108 is inversely proportional to the decrease in gain in channel 107. Thus the stability of the system is preserved. In this regard it will be noted that the system includes a substantially closed signal current circuit which comprises the two channels 107 and 108 and the coupling path through the hybrid system 103, and that if the two amplifier tubes 109 and 122 are both operated at the high gain settings required during signal current transmission, the total gain around the closed circuit, including the acoustical coupling path between the loudspeaker 105 and the microphone 104, may substantially exceed the electrical and acoustical losses of the system. When this condition prevails the system is highly unstable and an oscillatory condition may be set up therein even when signal currents of relatively small amplitudes are transmitted therethrough. Due to the control network 150, however, the total gain around the closed circuit of the system is maintained below the predetermined value at which the circuit is unstable by concurrently increasing the gain of the incoming channel 108 and decreasing the gain of the outgoing channel 107. Accordingly, the stability of the system is preserved even though signal currents of substantial magnitude are received over the incoming channel 108.

Each time signal current transmission received over the incoming channel 108 is terminated, the signal input to the control network 150 is also terminated. When this occurs the bias voltage across the resistor 145 is restored to zero, whereby the space current paths through the output electrodes 146a and 146b of the tube 146 and the voltage drops across the two biasing resistors 147 and 148 are restored to normal. The signal current gain through the amplifier tube 109 is thus increased to normal and the signal current gain through the amplifier tube 122 is decreased to its normal partial blocking value. The rate at which the bias voltages across the resistors 147 and 148 are restored to normal is primarily determined by the time constant of the network comprising the resistor 145 and the condenser 144 together with the value of the grounded condensers 151 and 152. The resistance and capacitance values of these elements are proportioned to provide the necessary "hangover" period at each signal current breakoff point, in order to prevent syllable clipping which would otherwise occur.

Figures 4, 5, 6, 7, 8:
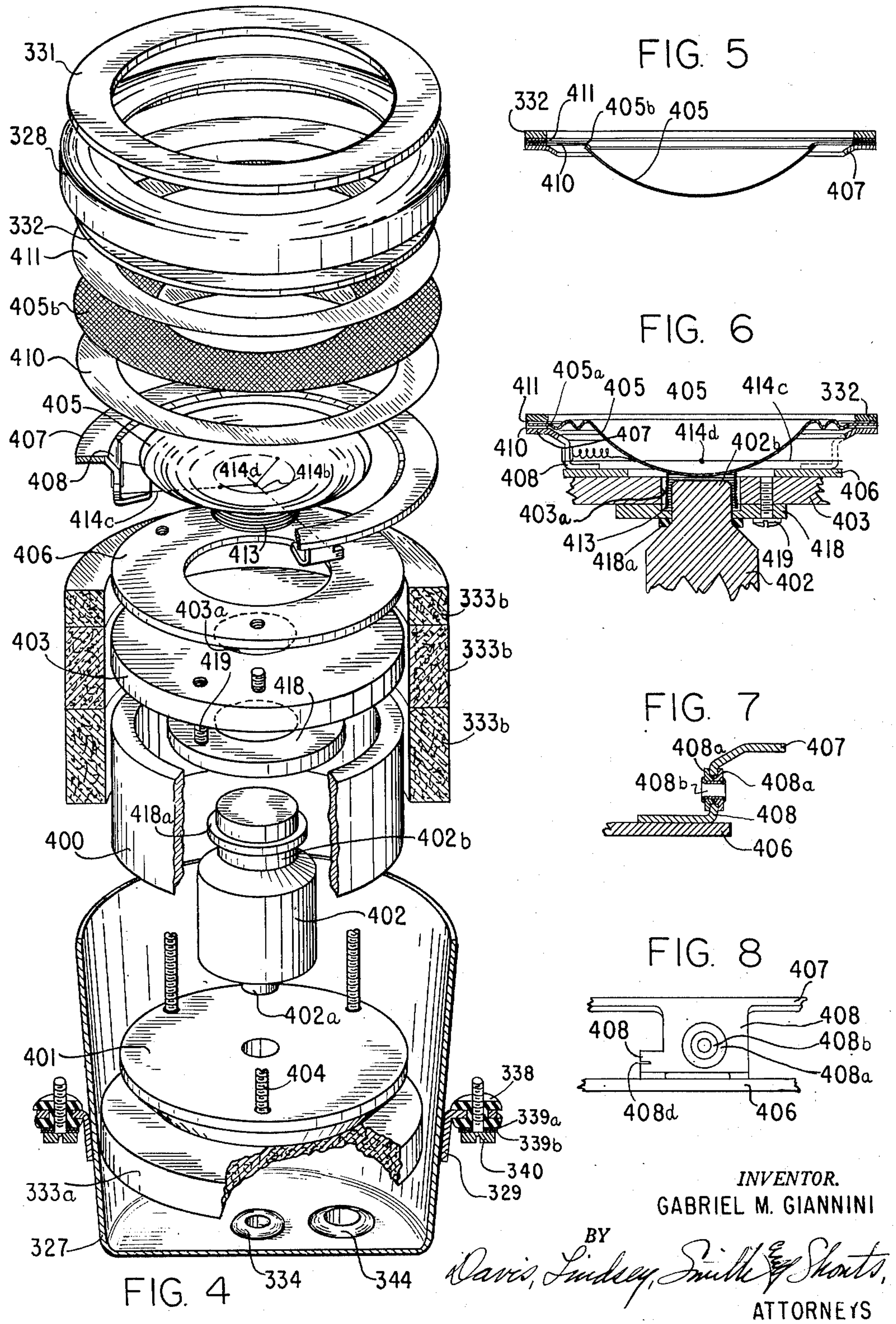

Referring now to Figs. 2, 3 and 4 of the drawings, the substation instrument there illustrated comprises a casing 300 provided with four substantially perpendicular walls which converge and terminate in a convexed, forwardly sloping top wall portion. The convexed top wall portion of the casing 300 is provided in order to minimize acoustical coupling between the front surfaces of the diaphragms of the loudspeaker 105 and microphone 104 housed within the casing 300. Furthermore, the loudspeaker and microphone units are provided with individual subcasings, the former subcasing constituting an integral part of the main casing 300 and the latter subcasing constituting a separate demountable casing whereby the microphone unit and its associated casing may be readily removed from the main casing 300. In order to further minimize acoustical coupling between the rear surfaces of the diaphragms of the two translating units, the loudspeaker and microphone subcasings are filled with acoustical damping material, such, for example, as felt.

More specifically considered, the main casing 300 comprises a slightly inwardly sloping front wall portion 301, a substantially perpendicular rear wall portion 302, and a pair of substantially perpendicular side wall portions, the right side wall 303 being illustrated in Fig. 2. The top wall portion 304 is somewhat convexed and is slightly sloped from the higher rear wall 302 toward the lower front wall 301 and converges with all the wall portions of the casing 300. A plurality of apertures 305 and 306 are also provided in the casing 300 and constitute sound openings for the microphone 104 and loudspeaker 105, respectively, mounted within the main casing 300. A dialing mechanism 307 is secured in an opening in the top surface of the casing when the substation instrument is connected to an automatic telephone system, or in the event the substation instrument is connected to a manual telephone system a blank escutcheon plate may be substituted in place thereof. For the purpose of permitting sound waves developed during the operation of the ringer 352, mounted within the casing 300, to be transmitted to the surrounding air, a plurality of rectangularly shaped slots 309 are provided in spaced-apart relation along the lower perpendicular side walls of the casing 300. A plurality of decorative strips 310 are secured to the surface of the casing, which strips may be formed, for example, of highly polished or plated metal or of colored plastic material.

The casing 300 may be formed of an insulating material, such, for example, as Bakelite, or it may be formed of a metal and is preferably moulded in one piece. In forming the casing 300 the bottom thereof is left open in order to facilitate the mounting of the various elements of the substation apparatus within the chamber defined by the above described wall structure, a base plate 311 being provided for closing the chamber defined by the walls of the casing. The casing 300 is also formed with a cylindrical subcasing 312 which extends downwardly from the top wall of the main casing 300 to a point substantially midway between the top and the bottom thereof and formed integrally therewith so that a portion of the cylindrical wall forms a portion of the rear wall 302 and a portion of the side walls 303 of the casing 300. The bottom of the subcasing 312 is also left open in order to facilitate the mounting of the loudspeaker unit 105 within the cavity formed by the subcasing 312 with the loudspeaker diaphragm positioned adjacent the opening 306 in the top of the main casing 300. A cover plate 313 is provided for closing the cavity defined by the cylindrical wall of the subcasing 312.

In order to prevent the diaphragm of the loudspeaker unit 105 from being damaged, a protective screen 314 of silk or fine mesh metal wire is provided in the opening 306 and secured in place by cementing the same to the peripheral edge portion of the opening or by merely clamping the same in place under pressure. The rubber gasket 315 placed between the diaphragm supporting ring and the screen 314 placed over the opening 306 in the casing 300 effectively prevents passage of air or sound waves around the edge of the loudspeaker diaphragm from the outside to the inside, or vice versa, of the chamber formed by the subcasing 312. The rubber gasket 315 also prevents sound waves originating at one surface of the loudspeaker diaphragm from impinging upon the other surface thereof. In order to prevent acoustical coupling between the rear surface of the loudspeaker and the microphone diaphragms, and to prevent undesirable resonance effects within the chamber formed by the subcasing 312, a suitable amount of acoustical insulating material such as, for example, a plurality of compressible felt rings 316 are provided, which substantially surround the loudspeaker unit 105.

The loudspeaker unit 105 is mounted upon the cover plate 313 by a plurality of screws 317, one of which is shown in Fig. 3, and for the purpose of preventing the cover plate 313 and any other solid structure mechanically connected thereto from transmitting vibrations either to or from the loudspeaker unit 105, a mounting assembly of the cushion type is provided. More specifically, the annular recess provided in the soft rubber grommet 318*a* snugly engages the adjacent surfaces of the opening formed in the cover plate 313, and a mounting screw 317 having a metal washer 319 and a locking washer 321 extends through a central opening provided in the grommet 318*a* and through the central opening of the soft rubber grommet spacer 318*b*, and is threaded into a tapped hole provided in the loudspeaker unit 105. Preferably three such cushion type mountings are provided to resiliently secure the loudspeaker unit upon the cover plate 313.

For the purpose of securing the cover plate 313 to the subcasing 312, a plurality of equally spaced tapped holes are provided into which the screws 322*a*, having locking washers 322*b*, are threaded after they have been inserted in corresponding holes provided in the cover plate 313. A soft rubber gasket 323 is placed between the cover plate 313 and the bottom surface of the subcasing 312, whereby the screws 322*a* may be utilized to draw the loudspeaker unit 105 upwardly to securely clamp the flexible soft rubber gasket 315 between the diaphragm supporting ring of the loudspeaker unit 105 and the under surface adjacent the sound opening 306 in the main casing 300. The screws 322*a* are also effective to securely clamp the soft rubber gasket 323 between the cover plate 313 and the bottom surface of the subcasing 312. The soft rubber gasket 323 functions as a seal between the cover plate 313 and the subcasing 312 and prevents, in combination with the acoustical insulating material 316, sound waves emanating from the rear surface of the loudspeaker diaphragm from passing to the front surface thereof and from passing to the microphone diaphragm. The density of the acoustical material 316 surrounding the loudspeaker unit 105 may be altered in order to vary the frequency response of the loudspeaker diaphragm. Thus the frequency response characteristics of the loudspeaker are enhanced and troublesome acoustical coupling between the sound waves created by the rear surface of the loudspeaker diaphragm and the microphone is prevented.

Since the in and out wires (not shown) forming the voice coil of the loudspeaker unit 105 are somewhat fragile, they are soldered to terminals secured to the diaphragm support. A pair of heavier stranded lead-in wires are also soldered to the terminals, as will be described hereinafter, in order to provide somewhat flexible electrical connections between the voice coil wires and the exterior of the subcasing 312. In order to facilitate electrical connection between the incoming amplifier 108 and the stranded lead-in wire extending to the voice coil terminals, a terminal block 324 of insulating material has been provided whereby the above-mentioned stranded lead-in wires may be secured thereto for electrical connection with the conductors extending to the incoming channel amplifier 108. More specifically, the terminal block 324 comprises a plurality of terminals 324*a*, secured thereto in any suitable manner, which are adapted to accommodate the terminal screws 324*b*. The terminal block 324 is held in spaced relation upon the cover plate 313 by the metal spacers 325 and the screws 322*b*, which are somewhat longer than the cover plate securing screws 322*a*, and are threaded into tapped holes in the bottom surface of the subcasing 312 to secure the terminal block and the cover plate in position. The above-mentioned insulated wires (not shown) are inserted through a central opening provided in the soft rubber grommet 326, which snugly engages the adjacent surfaces of the opening formed in the cover plate 313, and are directly secured to the terminals 324*a* by means of the screws 324*b*. In order to completely seal the cavity formed by the subcasing 312 and to prevent sound waves from passing through the central opening in the grommet 326, said opening may be sealed with sealing wax or the like.

From the foregoing description it will be understood that the loudspeaker unit 105 is mounted in a subcasing 312 which is a part of and integral with the main casing 300. Furthermore, it will be understood that although sound waves created at the rear surface of the loudspeaker diaphragm are completely isolated from sound waves created by the front surface thereof and vice versa, the loudspeaker unit may be removed from and replaced in the subcasing 312 in order that it may be readily adjusted and repaired.

It will be seen that the microphone unit 104 is mounted in a subcasing which is detachably mounted in the main casing 300. More specifically, a protective screen 330 of silk or fine mesh metal wire is provided in the opening 305 and secured in place by cementing the same to the peripheral edge portion of the opening. A rubber gasket 331 is placed between the shallow cup-shaped member 328 of the microphone subcasing and the protective screen 330 in the opening 305 of the main casing to further clamp the peripheral edge portion of the screen surrounding the opening 305. The screen 330 and the rubber gasket 331 may be secured in place by cementing the same to the peripheral edge portion around the opening 305, or they may be merely clamped in place by pressure applied in mounting the subcasing for the microphone unit. The subcasing for the microphone 104 comprises the front cup-shaped member 328 and the rear cup-shaped member 327, the latter cup-shaped member being the portion to which the microphone 104 and the acoustical material is mounted before the subcasing is inserted and secured in place in the main casilng 300. A detailed description of the various elements mounted within the subcasing comprising the members 327 and 328 will be given subsequently in connection with Figs. 4 to 8, inclusive.

Referring again to Fig. 3, it will be noted that in order to mount the casing 327 in the main casing 300, a plurality of L-shaped mounting brackets 329 are secured to the rear cup-shaped casing member 327 in spaced relation around the outside surface thereof. The L-shaped brackets are each provided with an opening into which a soft rubber grommet 338 is inserted so that the annular recess of the grommet snugly engages the adjacent surfaces of the said opening. A mounting screw 340, provided with a metal washer 339a and a locking washer 339b, extends through the central opening in the grommet 338 and is threaded into a tapped hole provided in an associated lug-shaped member 337 in the casing 300. Preferably three such cushion type mountings are provided to secure the subcasing 327—328 and the microphone unit 104 in proper relationship with the opening 305. Furthermore, the cushion type mounting referred to above, in combination with the soft rubber gasket 331 engaging the peripheral edge of the opening 305, is utilized to permit the microphone unit and its associated casing to be tightly clamped in position and thereby prevent any sound waves from reaching the rear surface of the microphone diaphragm.

The individual microphone unit 104 is identical with the loudspeaker unit 105, with the exception that the diaphragm for the microphone 104 is provided with an oil silk ring cemented to the periphery of the moulded fiber cone portion whereas the diaphragm for the loudspeaker 105 is a single unitary structure of moulded fiber, as is illustrated in Figs. 5 and 6, respectively. Referring now to Fig. 4, a description will be given of the various structural elements forming the microphone unit 104. It should be understood, however, that this description also applies to the loudspeaker unit 105 with the exceptions noted above. In this figure, all the parts forming the microphone unit 104 are shown in exploded relationship to each other, together with the various elements constituting the subcasing assembly utilized in mounting the microphone within the main casing 300. The microphone assembly comprises a self-contained magnetic circuit which includes a permanently magnetized annular ring 400 formed of Alnico, a bottom plate 401, a center pole piece 402, and a top plate 403. The parts 401, 402 and 403 are preferably formed of Allegheny electric metal or other highly permeable magnetic material. The center pole piece 402 is provided with a lower portion 402a of reduced diameter, which extends within a centrally disposed opening provided in the bottom plate 401. A sweat connection between the side walls of this opening and the sides of the extended portion 402a may be riveted over on the bottom surface of the plate 401 and thus rigidly secure the center pole piece 402 to the bottom plate 401. At its upper end the center pole piece 402 is provided with a portion 402b of reduced diameter, which extends within a centrally disposed opening 403a formed in the top plate 403. As best shown in Fig. 6 of the drawings, the diameter of the opening 403a is slightly larger than the diameter of the upper portion 402b of the pole piece 402. The upper end of the center pole piece is concentrically disposed within the opening 403a whereby an annular air gap is formed between the adjacent side walls of the opening and the center pole piece. The magnetic circuit assembly is completed by means of three clamping screws 404 which extend through openings provided in the bottom plate 401 and the top plate 403, and are threaded into tapped holes drilled in the bottom plate 406 of the diaphragm support basket assembly. These screws serve rigidly to clamp the annular permanent magnet 400 between the top and bottom plates 403 and 401 and to secure the diaphragm support assembly in proper alignment with the center pole piece 402.

The moving system of the microphone comprises a dome-shaped diaphragm 405 which is formed of moulded fiber or the like and is carried by the diaphragm support basket assembly which comprises the bottom plate 406 and a diaphragm supporting ring 407 having three inwardly extending L-shaped brackets 408 which are welded to the upper surface of the plate 406. The moving system also includes two paper washers 410 and 411 between which the peripheral edge of the diaphragm 405 is clamped. The character of the particular diaphragm utilized depends upon whether the device is to be used as a loudspeaker or as a microphone. If the device is to be used as a loudspeaker the diaphragm is of one-piece moulded construction including an inverted dome-shaped portion 405, a concentric annular corrugated portion, and an outer flat annular ring portion 405a which extends between and is cemented to the paper washers 410 and 411 in the manner illustrated in Fig. 6. If the device is to be used as a microphone the diaphragm construction illustrated in Fig. 5 of the drawings is used. In this construction the inverted dome-shaped portion 405 of the diaphragm is formed of moulded fiber, the periphery thereof being cemented to an annular ring 405b of oil silk which is disposed between and cemented to the paper washers 410 and 411. The purpose of the latter arrangement is to permit substantially free vibration of the diaphragm element 405, particularly at the low frequencies of the operating frequency range, whereby the response of the device at these frequencies is enhanced. With the one-piece diaphragm arrangement, as utilized in the loudspeaker unit, the diaphragm is considerably stiffer and, accordingly, the response thereof, particularly at low frequencies, is substantially less than when the diaphragm having the peripheral oil silk ring is used. By virtue of this increased stiffness, low frequency noise components of sound are prevented from producing any substantial response of the device.

A moving voice coil 413 is cemented to the lower inverted dome-shaped portion 405 of the diaphragm and is concentrically disposed within the air gap defined by the upper portion 402b of the center pole piece 402 and the opening 403a in the top plate 403. The ends of the fine wire voice coil may be connected to flexible stranded lead-in wires in any desired manner, although preferably the connections are made by soldering the ends of the voice coil wires to terminals secured to the L-shaped brackets 408 of the diaphragm support basket assembly, as is illustrated in the enlarged views shown in Figs. 7 and 8. More specifically, the L-shaped bracket 408 is provided with an opening therein into which a pair of insulating washers 408a are inserted having enlarged shoulder portions adjacent the surfaces surrounding the periphery of the said opening. The insulating washers 408a are provided with a central opening into which a brass eyelet 408b is inserted, which has a shoulder portion formed at one end and is riveted over at the opposite end, thereby to maintain the eyelet 408b and the insulating washers 408a in assembled relationship with the L-shaped bracket 408. The ends of the heavier stranded lead-in wires (not shown) are also soldered to the abovementioned eyelet terminals 408b and the opposite ends thereof are connected to the terminal block 342, in the same manner as has been described hereinbefore in connection with the loudspeaker 105, for electrical connection with the conductors extending to the outgoing channel amplifier 107.

In order to preserve the correct lateral and axial spacing of the moving coil 413 in the air gap of the magnetic circuit, and to provide an additional support for the diaphragm 405, a string supporting arrangement is provided. This arrangement comprises three connected strings 414a, 414b and 414c which extend through equiangularly spaced openings cut through the lower portion of the diaphragm member 405 and are joined together, as indicated at 414d, within the dished cavity of this member. The free ends of each of the three strings are respectively placed in a slot 408d in the extended portion 408c of the equiangularly spaced L-shaped brackets 408, and are anchored in place by upsetting the slot 408d to clinch the string therebetween, and are then cemented. Preferably the three strings 414a, 414b and 414c are formed of fish line or the like and it will be understood that by appropriately tensioning the three strings the required support for the moving coil 413 may be obtained.

In order to seal the annular cavity, formed between the spaced-apart annular permanent magnet 400 and the center pole piece 402, from the acoustical cavity adjacent the lower side of the diaphragm 405, thereby to enhance the damping of the diaphragm and thus produce a more uniform response thereof over the entire operating frequency range, a sealing ring 418 is provided which snugly encloses the upper end portion 402b of the center pole piece 402, and is clamped to the underside of the top plate 403 by means of a plurality of assembly screws 419. This ring is preferably formed of brass or other non-magnetic material and to further insure the complete sealing of the space between the sealing ring 418 and the portion 402b of the center pole piece 402 a rubber gasket 418a is cemented at the juncture of the sealing ring 418 and the end portion 402b.

As pointed out above, each loudspeaker and microphone unit, as constructed in the manner just described, is preferably surrounded by acoustical insulating material, such as a plurality of felt rings, to prevent the transmission of sound waves to or from the rear side of the diaphragm of the unit. In the arrangement illustrated in Fig. 4, which is an exploded view of the microphone and casing therefor shown in the right-hand portion of Fig. 3, the cup-shaped casing member 327 constitutes the subcasing for the microphone assembly.

The microphone unit 104 is mounted in the cup-shaped casing 327 by a plurality of screws 334, one of which is shown in Fig. 3, and for the purpose of preventing the casing 327 and any other solid structure mechanically connected thereto from transmitting vibrations to the microphone unit, a mounting assembly of the cushion type is provided. More specifically, the annular recess provided in the soft rubber grommet 334a snugly engages the adjacent surfaces of the opening formed in the bottom surface of the casing 327, and a mounting screw 334 having a metal washer 335 and a locking washer 336 extends through a central opening provided in the grommet 334a and through the central opening provided in a rubber grommet spacer 334b and is threaded into a tapped hole provided in the bottom plate 401 of the microphone unit. Preferably three such cushion type mountings are provided to secure the microphone unit 104 to the casing 327.

In order to prevent acoustical coupling between the rear surface of the microphone diaphragm and the surrounding air, and to prevent undesirable resonance effects within the cavity formed by the casing 327, a suitable amount of acoustical insulating material is provided in the cavity and substantially surrounds the microphone unit. More specifically, in securing the microphone unit 104 a compressible felt ring 333a is placed between the bottom of the casing 327 and the bottom plate 401 of the microphone, and a plurality of compressible felt rings 333b are placed around the microphone unit 104 to completely fill the space between the wall of the unit and the inside wall of the casing 327. In completing the assembly of the microphone unit 104 in the casing 327, a soft rubber gasket 332 may be cemented to the paper ring 411 which secures the peripheral edge of the microphone diaphragm on the supporting ring 407 in order to provide a cushion seal between the edge of the diaphragm and the cup-shaped casing cover 328. The open end of the casing cover 328 is slightly larger than the open end of the casing 327 and provides a close-fitting cover for compressing the soft rubber gasket 332 and the felt rings 333*a* and 333*b*. The microphone unit 104 and its individual subcasing may now be mounted in the previously described manner to cooperate with the opening 305 provided in the main casing 300.

A terminal block 342 of insulating material has been provided in order to terminate the incoming electrical conductors extending between the outgoing amplifier 107 and the voice coil of the microphone unit 104. These incoming conductors provide the necessary electrical connection between the outgoing channel amplifier 107 and the voice coil leads of the microphone diaphragm. More specifically, the terminal block 342 comprises a plurality of terminals 342*a* secured thereto in any suitable manner, which are adapted to accommodate the terminal screws 342*b*. The incoming conductors may be detachably connected to the terminals by means of the terminal screws 342*b*, and the stranded lead-in wires extending to the diaphragm voice coil leads, which are soldered to the terminals in the diaphragm support assembly, may be electrically connected by soldering the stranded lead-in wires to the terminals 342*a*. The latter leads are threaded through the central opening provided in the soft rubber grommet 344, which snugly engages the adjacent surfaces of the opening formed in the bottom of the casing 327, and are soldered to the terminals 342*a* as mentioned above. In order to completely seal the cavity formed by the casing 327 and to prevent sound waves from passing through the central opening in the grommet 344, the central opening in the grommet may be sealed with sealing wax or the like. In order to provide a suitable mounting for the terminal block upon the surface of the casing 327, a pair of threaded spacer lugs 341 are affixed to the rear surface of the casing in any suitable manner, such as, for example, by welding or soldering. The screws 343 provided with the usual locking washers may be inserted through appropriate holes provided in the terminal strip 342 and threaded into the tapped holes in the spacers 341, thereby to rigidly secure the terminal strip 342 in spaced relation upon the rear of the casing 327.

As shown, the top surface 304 of the casing 300 is provided with an opening into which the dial mechanism 307 is inserted so that a portion of the bottom surface of the dial 307 rests upon the shoulder portion 345 which is slightly smaller in diameter than the diameter of the dialing mechanism itself. The dialing mechanism is secured in the above opening by means of a plurality of mounting screws 346*a* and associated locking washers 346*b* (one of which is shown in Fig. 3). As diagrammatically indicated by the dotted line 347, a portion of the operating mechanism of the dialing mechanism projects through the opening provided in the top surface of the casing 300, but it is so situated that it does not interfere with the removal of the microphone casing 327 from the main casing 300.

Since the substation instrument is to be utilized in connection with a telephone system, a portion of the telephone apparatus utilized in signaling a called substation may be mounted upon the base plate 311. More particularly, this apparatus comprises a condenser 355 and a ringer 352 mounted upon the base plate 311 in the same manner as is described in detail in the Obergfell Patent No. 2,272,474, granted February 10, 1942. Briefly considered, the mounting arrangement for the condenser 355 comprises a bracket member 354, secured to the side of the condenser housing, which has a U-shaped configuration and is mounted upon the cover plate 311 by means of screws extending through the base plate and threaded into tapped openings provided in the bracket 354, the heads of the screws being effectively countersunk in raised wells formed in the base plate 311 in the manner illustrated. The ringer 352 comprises a field structure including a polarizing permanent magnet 351 and a pair of windings, one of which is indicated at 353. Also embodied in the ringer are a pair of bells, one of which is shown, carried by a bracket 357 and a striker assembly, not shown, of conventional arrangement. For the purpose of preventing the base plate 311 and any other solid structure mechanically connected thereto from exerting any damping influence upon the bells of the ringer 352 during the operation of the ringer, and also for preventing vibrations created by the ringer from being transmitted through the solid structure of the instrument to either the microphone 104 or the loudspeaker 105, a mounting assembly of the cushion type is used for supporting the ringer upon the base plate 311. This mounting assembly comprises a plurality of soft rubber grommets and the usual mounting screws which secure the ringer assembly and the associated grommets to the base member 311 in the manner described in the above-mentioned Obergfell patent. For the purpose of permitting sound waves developed during the operation of the ringer 352 to be transmitted through the outside casing 300, a plurality of rectangularly shaped slots 309 are provided in evenly spaced apart relation around the lower perpendicular side walls of the casing 300. In order to prevent foreign material and dust from being lodged within the casing 300, the slots 309 may be covered by a fine mesh wire screen or the like which is secured to the interior surface of the casing member 300.

For the purpose of detachably securing the base plate 311 to the casing 300 a plurality of mounting lugs 350*a* and 350*b* are moulded or cast as an integral part of the casing and project inwardly from the perpendicular rear and side walls thereof. A third lug, not shown, is formed in the opposite side wall of the casing 300. Each of the mounting lugs is drilled and tapped to receive a threaded portion of the mounting screws, such as screws 349*a* and 349*b*. The screws are locked to the base plate 311 and the heads thereof are effectively countersunk in raised wells provided in the base plate in the manner illustrated. Screws 349*a* and 349*b* are threaded into tapped holes in the mounting lugs 350*a* and 350*b* respectively and serve, together with the not shown third screw and associated mounting lug, to clamp the rim of the base plate 311 against the receiving ridge formed in the lower edge of the casing 300. For the purpose of preventing the base plate from contacting the surface of the object upon which it is supported, a flexible cushioning element 348 formed of soft rubber is stretched around the rim of the base plate 311, so that a portion 348*a* thereof extends inwardly around the peripheral portion of the base plate and a portion 348*b* thereof is clamped between the base plate and the bottom ridge portion of the casing 300 when the base plate is mounted upon the casing by the screws 349*a* and 349*b*.

The substation instrument described above is disclosed and claimed in the copending divisional application of Gabriel M. Giannini, Serial No. 716,023, filed December 13, 1946.

While one embodiment of the invention has been disclosed, it will be understood that various modifications may be made therein which are within the true spirit and scope of the invention.

What is claimed is:

1. A transmission system comprising two signal channels, two amplifier tubes respectively included in said channels, two screen electrodes respectively included in said tubes, a control circuit including two output electrodes respectively connected to two resistors and a common source of current connected to said resistors and two biasing conductors respectively connected between said screen electrodes and said resistors, means for normally establishing two control currents respectively traversing said output electrodes and said resistors and commonly traversing said common source of current in order normally to establish two biasing potentials applied to said screen electrodes so that a maximum signal gain is normally established through one of said channels and a below maximum signal gain is normally established through the other of said channels, and means responsive to signal currents traversing said other channel for varying in opposite senses said control currents traversing said output electrodes and said resistors in order to vary in opposite senses said two biasing potentials normally applied to said screen electrodes so that the signal gains through said channels are varied in opposite senses.

2. A transmission system comprising two signal channels, two amplifier tubes respectively included in said channels, two screen electrodes respectively included in said tubes, a control tube including two output electrodes respectively connected to said screen electrodes, means for normally establishing two space currents respectively traversing said output electrodes in order normally to establish two biasing potentials respectively applied to said screen electrodes so that a maximum signal gain is normally established through one of said channels and a below maximum signal gain is normally established through the other of said channels, means including a rectifier responsive to signal currents traversing said one channel for producing a rectified current, means for developing two control potentials of opposite senses from said rectified current and for impressing them to vary in opposite senses said normal space currents traversing said output electrodes in order to vary in opposite senses said normal biasing potentials applied to said screen electrodes so that the signal gains through said channels are varied in opposite senses.

3. A transmission system comprising two signal channels, two amplifier tubes respectively included in said channels, two screen electrodes respectively included in said tubes, a control tube including two output electrodes respectively connected to said screen electrodes, means for normally establishing two space currents respectively traversing said output electrodes in order normally to establish two biasing potentials respectively applied to said screen electrodes so that a maximum signal gain is normally established through one of said channels and a blocking signal gain is established in the other of said channels, means including a band pass filter connected to said other channel for only passing signal currents in a predetermined frequency range traversing said other channel, means including a rectifier connected to said filter and operated responsive to signal currents passed thereby for producing a rectified current, and means for developing two control potentials of opposite senses from said rectified current and for impressing them to vary in opposite senses said space currents traversing said output electrodes in order to vary in opposite senses said normal biasing potentials applied to said screen electrodes so that a blocking signal gain is established in said one channel and a maximum signal gain is established through said other channel.

GABRIEL M. GIANNINI.

REFERENCES CITED

The following references are of record in the file of this patent:

UNITED STATES PATENTS

| Number | Name | Date |
|---|---|---|
| 1,432,623 | Riley | Oct. 17, 1922 |
| 2,018,464 | Nebel | Oct. 22, 1935 |
| 2,205,142 | Hoard | June 18, 1940 |
| 2,208,160 | McCreary | July 16, 1940 |
| 2,213,991 | Mitchell | Sept. 10, 1940 |
| 2,214,804 | Augustadt | Sept. 17, 1940 |
| 2,267,557 | Espenschied | Dec. 23, 1941 |
| 2,282,405 | Herrick | May 12, 1942 |
| 2,304,796 | Cavanaugh | Dec. 15, 1942 |
| 2,332,430 | Berger | Oct. 19, 1943 |
| 2,370,388 | Baird | Feb. 27, 1945 |